May 8, 1956 R. T. MALONEY 2,744,667
PORTABLE CABINET STRUCTURE FOR AUTOMOBILES
Filed Sept. 28, 1953 2 Sheets-Sheet 1

INVENTOR
Roy T. Maloney
BY Webster & Webster
ATTYS

May 8, 1956  R. T. MALONEY  2,744,667
PORTABLE CABINET STRUCTURE FOR AUTOMOBILES
Filed Sept. 28, 1953  2 Sheets-Sheet 2
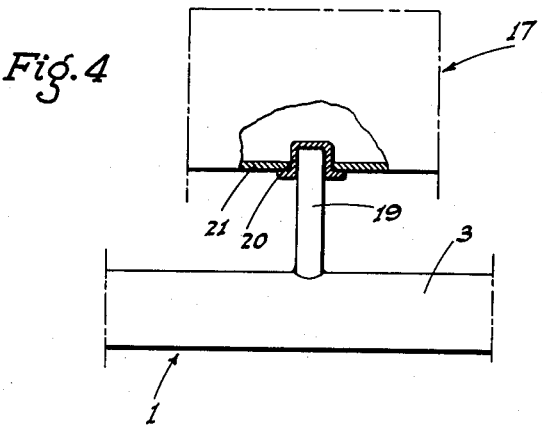
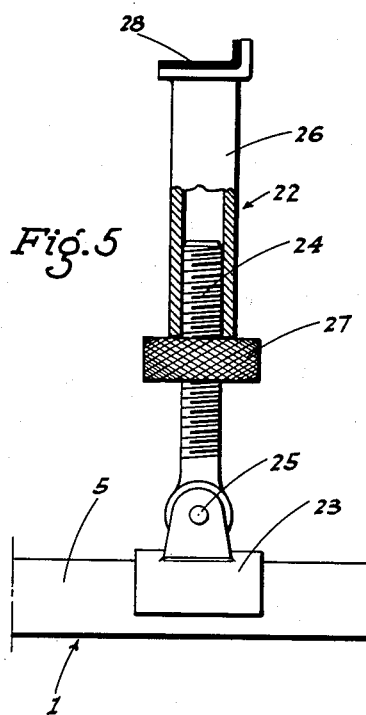
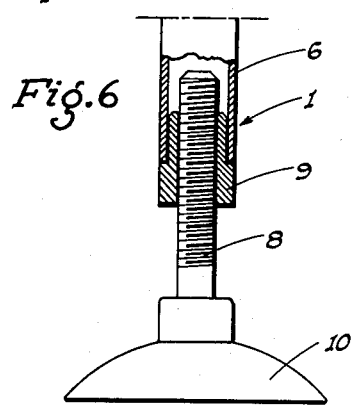
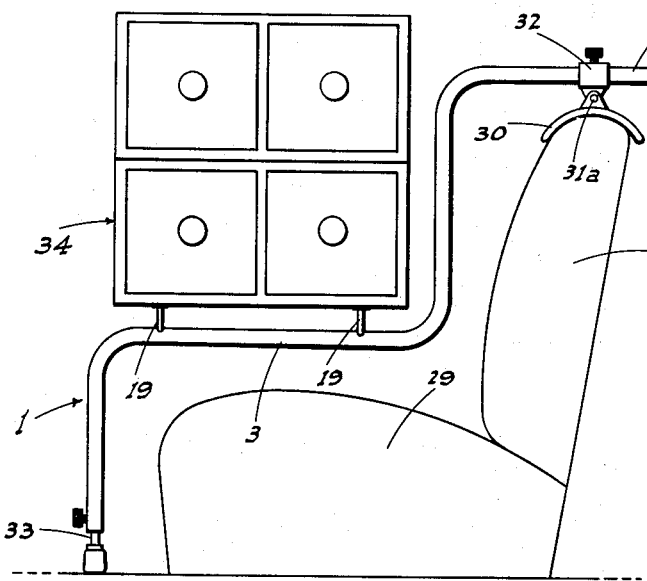
INVENTOR
Roy T. Maloney
BY
Webster & Webster
ATTYS

United States Patent Office 2,744,667
Patented May 8, 1956

2,744,667
PORTABLE CABINET STRUCTURE FOR AUTOMOBILES

Roy T. Maloney, Sacramento, Calif.

Application September 28, 1953, Serial No. 382,529

2 Claims. (Cl. 224—29)

This invention relates to a portable cabinet structure, and particularly to one designed for the use of salesmen and the like while traveling in their automobiles.

The principal object of the invention is to provide a cabinet structure for the purpose, including a number of filing or storage cabinets, and a supporting frame for the cabinets arranged to be removably mounted in an automobile in such a manner that the cabinets are held in a fixed position and in stabilized relation in the car.

Another object is to provide a cabinet structure, as above, in which the cabinets are readily accessible, without lifting or shifting of any cabinet, to the driver of the vehicle.

A further object is to provide a supporting frame for the cabinets arranged to maintain the latter above and clear of the seat of an automobile so that any give of the seat, as occasioned by a person occupying the seat to one side of the frame, will not affect said frame or the cabinets supported thereby.

Another object of the invention is to provide a cabinet supporting frame arranged to be mounted either in connection with the front or the rear seat of an automobile, as may be desired.

Still another object of the invention is to provide a portable cabinet which is practical, reliable, and durable, and one which is exceedingly effective for the purpose for which it is designed.

These objects are accomplished by means of such structure and relative arrangement of parts as will fully appear by a perusal of the following specification and claims.

In the drawings:

Fig. 4 is an enlarged fragmentary elevation, partly broken out and in section, showing the manner in which a cabinet is supported from the frame.

Fig. 5 is a similar view of an adjustable brace member.

Fig. 6 is a similar view of an adjustable foot.

Fig. 7 is a side elevation of a cabinet and frame structure as mounted in connection with the front seat of an automobile.

Figure 1:
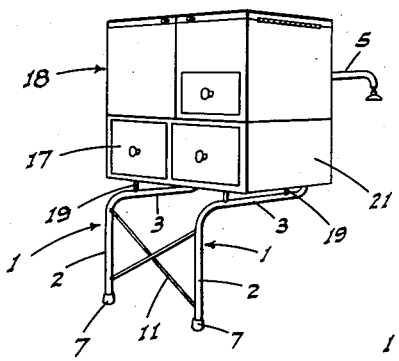
Fig. 1 is a perspective view of the improved cabinet and supporting frame structure, as detached from an automobile.
Figure 2:
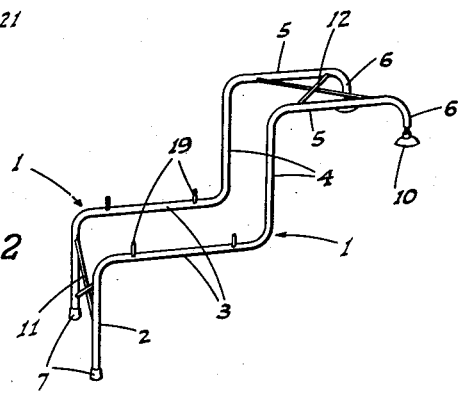
Fig. 2 is a similar view of the frame alone.

Referring now more particularly to the characters of reference on the drawings, and particularly at present to Figs. 1 to 6, the supporting frame of the structure comprises a pair of identical transversely spaced unitary members 1 preferably formed of light but rigid metal tubing. Each member comprises an upstanding leg 2 at the front, a rearwardly projecting bar 3 at the upper end of the leg, an upright 4 at the rear end of the bar, and a rearwardly projecting extension 5 at the upper end of the upright; said extension terminating at its lower end in a relatively short depending portion 6.

Each leg 2 is provided with a foot cap 7 of rubber or similar non-slip material.

A threaded stem 8 projects upwardly into each portion 6 through a nut 9 supported by the lower end of said portion (see Fig. 6); the stem carrying a foot in the form of a relatively large suction cup 10 on its lower end.

The members 1 are rigidly connected together by means which preferably comprises a diagonal brace rod unit 11 extending between the legs 2, and another diagonal brace rod unit 12 extending between the rear horizontal extensions 5.

Figure 3:
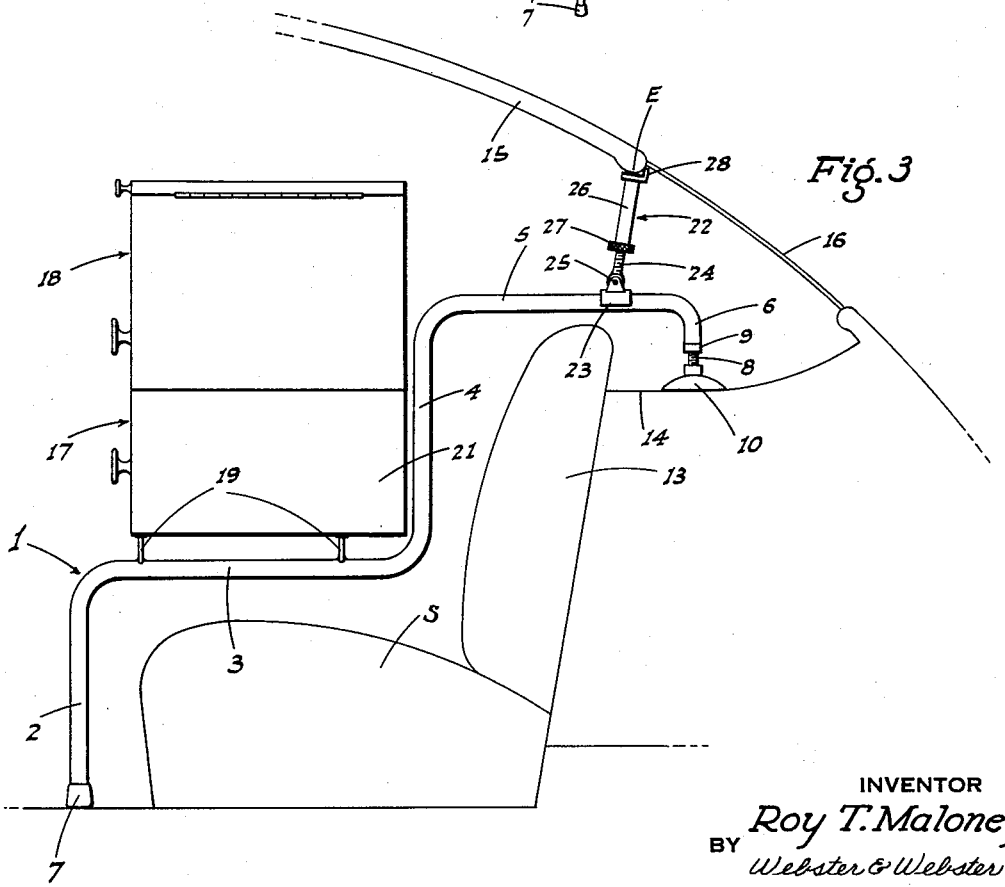
Fig. 3 is an enlarged side elevation of the structure as mounted in connection with the back seat of an automobile of a conventional type.

The dimensions of the frame members 1, relative to the substantially standard dimensions of an automobile seat S and the upstanding seat back 13 are such that the bars 3 will clear the seat, and the extensions 5 will clear the top of the seat back 13, as shown in Fig. 3.

The depending portions 6, and the cups 10, then overhang the usual deck 14 formed in the car behind the seat back and extending from said seat back to the sloping roof 15 of the car, and in which the rear window 16 is disposed adjacent said deck.

When the frame structure is thus disposed, the cups 10 are pressed into holding engagement with the deck 14; the stem 8 being first relatively adjusted, if necessary, so as to set the bars 3 in a substantially horizontal position.

In order to mount a number of rectangular filing cabinets, either of the drawer type—as shown at 17—or of the top-opening bin type—shown at 18—on the supporting frame, the bars 3 are provided with rigid upstanding dowels 19 adapted to engage at their upper end in thimbles 20 set into the bottom of the casing 21 of the lowest cabinet, as shown in Fig. 4; any cabinet above said lowest one being detachably connected thereto in a similar manner.

The width of the cabinets is preferably no greater than half the width of the car seat S, and the structure is mounted above said seat on the side thereof opposite the driver of the car so that said driver may reach and open the cabinets without leaving his seat, if necessary.

In order to aid in holding the rear end of the frame structure down and taking some of the strain off the suction cups, detachable brace units 22 are provided.

As particularly shown in Fig. 5, each unit comprises a saddle 23 to seat on the adjacent extension 5 and on which saddle an upstanding threaded stem 24 is swivelly mounted transversely of the saddle, as shown at 25.

The stem is slidable in a socket tube 26 and is engaged intermediate its ends by a nut 27 bearing against the lower end of the tube. At its upper end, the tube carries a rubber lined flanged pad 28 adapted to seat against the transverse roof edge E exposed at the front end of the recessed window 16, as shown in Fig. 3.

If it is desired to mount the structure in connection with the front or driver's seat 29, as shown in Fig. 7, each extension 5 of the frame members is provided with a saddle 30 to engage over the top of the seat back 31; said saddle being swivelly hung, as at 31a from a slide 32 adjustably and removably clamped on said extension 5.

Additionally, at least one leg 2 is preferably adjustably telescopic, as indicated at 33, since in various automobiles the floor in front of seat 29 has a downward slope transversely from a point centrally of the width of the car, and the telescopic nature of one leg relative to the other enables the cabinet supporting bars 3 to be set on a level transversely.

This feature may also be of use at times when mounting the structure in connection with the rear seat, and this is true of the saddle 30 as well.

The cabinets 34, for front seat use, are mounted on the dowels 19 so as to face in a lateral direction, as shown in Fig. 7, so that the driver of the car, seated alongside said cabinets, has ready access thereto.

The cabinets, which are of wood, metal, or plastic, are suitably compartmented to contain samples, stock, literature, or other supplies.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A portable cabinet structure for mounting in an automobile having a seat and a seat back, said structure including with a cabinet, a frame to support the cabinet directly above and clear of the seat, the frame including a substantially horizontal cabinet supporting unit, legs on the unit to support the same from the floor of the vehicle in front of and clear of the seat, and elements rigid with the unit extending upwardly from between the cabinet and the seat back and provided with means to engage a fixed part of the vehicle adjacent the top of the seat back; the vehicle, behind the seat back being provided with a substantially horizontal deck, and said means including extensions projecting over the seat back from said elements, feet for deck engagement supported from the rear end of the extensions, and detachable and longitudinally adjustable brace units arranged to extend between said extensions and the roof of the vehicle above the extensions.

2. A structure as in claim 1 in which each brace unit includes a saddle detachably seated on the corresponding extension, a transverse pivot connection between the saddle and the lower end of the brace unit, and a roof engaging member on the upper end of the unit.

References Cited in the file of this patent

UNITED STATES PATENTS

| | | |
|---|---|---|
| 393,934 | Talbot | Dec. 4, 1888 |
| 2,536,293 | Koses | Jan. 2, 1951 |
| 2,543,202 | Robinson | Feb. 27, 1951 |
| 2,598,643 | Kaplan | May 27, 1952 |
| 2,640,634 | Francis | June 2, 1953 |
| 2,692,069 | Winters | Oct. 19, 1954 |

FOREIGN PATENTS

| | | |
|---|---|---|
| 947,723 | France | Jan. 17, 1949 |